United States Patent
Sun et al.

(10) Patent No.: US 11,913,776 B2
(45) Date of Patent: Feb. 27, 2024

(54) INTERFERENCE IN-SENSITIVE LITTROW SYSTEM FOR OPTICAL DEVICE STRUCTURE MEASUREMENT

(71) Applicant: Applied Materials, Inc., Santa Clara, CA (US)

(72) Inventors: Yangyang Sun, San Jose, CA (US); Jinxin Fu, Fremont, CA (US); Ludovic Godet, Sunnyvale, CA (US)

(73) Assignee: Applied Materials, Inc., Santa Clara, CA (US)

( * ) Notice: Subject to any disclaimer, the term of this patent is extended or adjusted under 35 U.S.C. 154(b) by 128 days.

(21) Appl. No.: 17/645,200

(22) Filed: Dec. 20, 2021

(65) Prior Publication Data

US 2022/0214163 A1     Jul. 7, 2022

Related U.S. Application Data

(60) Provisional application No. 63/134,442, filed on Jan. 6, 2021.

(51) Int. Cl.
*G01B 11/26* (2006.01)

(52) U.S. Cl.
CPC .................... *G01B 11/26* (2013.01)

(58) Field of Classification Search
CPC ............ G01B 11/26; G02B 2027/0125; G02B 5/1857; G02B 27/0172
See application file for complete search history.

(56) References Cited

U.S. PATENT DOCUMENTS

| | | | | |
|---|---|---|---|---|
| 4,688,907 A | * | 8/1987 | Kleinberg | G02B 21/22 359/381 |
| 5,253,038 A | * | 10/1993 | Bouwhuis | G01B 11/26 356/492 |
| 5,583,632 A | * | 12/1996 | Haga | G01N 21/8901 356/613 |

(Continued)

FOREIGN PATENT DOCUMENTS

EP        0822700 B1     4/2003

OTHER PUBLICATIONS

PCT Notification of Transmittal of the International Search Report and the Written Opinion of the International Searching Authority for International Application No. PCT/US2021/064377; dated Apr. 12, 2022.

*Primary Examiner* — Mohamed K Amara
(74) *Attorney, Agent, or Firm* — Patterson + Sheridan, LLP; Chad M. Dougherty

(57) ABSTRACT

Embodiments described herein provide for devices and methods of measuring a pitch P of optical device structures and an orientation angle φ of the optical device structures. One embodiment of the system includes an optical arm coupled to an arm actuator. The optical arm includes a light source. The light source emits a light path operable to be diffracted to the stage. The optical arm further includes a first beam splitter and a second beam splitter positioned in the light path. The first beam splitter directs the light path through a first lens and the second beam splitter directs the light path through a first dove prism and a second lens. The optical arm further includes a first detector operable to detect the light path from the first lens and second detector operable to detect the light path from the second lens.

20 Claims, 10 Drawing Sheets

(56) References Cited

U.S. PATENT DOCUMENTS

| | | | | |
|---|---|---|---|---|
| 6,473,443 | B1* | 10/2002 | Kuo | G03H 1/30 |
| | | | | 372/100 |
| 8,416,402 | B2* | 4/2013 | Shibata | G03F 7/7065 |
| | | | | 382/145 |
| 10,331,207 | B1* | 6/2019 | Simmons | H04N 13/383 |
| 10,725,302 | B1* | 7/2020 | Sharma | G06F 3/012 |
| 2014/0285429 | A1* | 9/2014 | Simmons | G02B 27/0179 |
| | | | | 359/259 |
| 2015/0282707 | A1* | 10/2015 | Tanabe | A61B 3/14 |
| | | | | 351/205 |
| 2020/0309598 | A1* | 10/2020 | Fu | G02B 5/1819 |
| 2021/0356910 | A1* | 11/2021 | Zhang | G11B 7/0065 |
| 2023/0210365 | A1* | 7/2023 | Chan | G02B 27/0172 |
| | | | | 345/8 |

* cited by examiner

INTERFERENCE IN-SENSITIVE LITTROW SYSTEM FOR OPTICAL DEVICE STRUCTURE MEASUREMENT

CROSS-REFERENCE TO RELATED APPLICATIONS

This application claims the benefit of U.S. Patent Application No. 63/134,442, filed Jan. 6, 2021, the contents of which are incorporated herein in their entirety.

BACKGROUND

Field

Embodiments of the present disclosure relate to devices and methods of measuring a pitch P of optical device structures and an orientation angle $\phi$ of the optical device structures.

Description of the Related Art

Virtual reality is generally considered to be a computer generated simulated environment in which a user has an apparent physical presence. A virtual reality experience can be generated in 3D and viewed with a head-mounted display (HMD), such as glasses or other wearable display devices that have near-eye display panels as lenses to display a virtual reality environment that replaces an actual environment.

Augmented reality, however, enables an experience in which a user can still see through the display lenses of the glasses or other HMD device to view the surrounding environment, yet also see images of virtual objects that are generated for display and appear as part of the environment. Augmented reality can include any type of input, such as audio and haptic inputs, as well as virtual images, graphics, and video that enhances or augments the environment that the user experiences. As an emerging technology, there are many challenges and design constraints with augmented reality.

One such challenge is displaying a virtual image overlaid on an ambient environment. Optical devices are used to assist in overlaying images. Fabricating optical devices can be challenging as optical devices tend to have properties, such as optical device structure pitches and optical device structure orientations that need to be manufactured according to specific tolerances. Conventional systems will experience a decrease in accuracy and repeatability when measuring optical device structures on non-opaque substrates due to reflection and diffraction of light. Accordingly, what is needed in the art are improved devices and methods of measuring a pitch P of optical device structures and an orientation angle $\phi$ of the optical device structures with increased accuracy and repeatability.

SUMMARY

In one embodiment, a system is provided. The system includes a stage having a substrate support surface. The stage is coupled to a stage actuator configured to move the stage in a scanning path and rotate the stage about an axis. The system further includes an optical arm coupled to an arm actuator configured to scan the optical arm and rotate the optical arm about the axis. The optical arm includes a light source. The light source emits a light path operable to be diffracted to the stage. The optical arm further includes a first beam splitter and a second beam splitter positioned in the light path. The first beam splitter directs the light path through a first lens and the second beam splitter directs the light path through a first dove prism and a second lens. The optical arm further includes a first detector operable to detect the light path from the first lens and second detector operable to detect the light path from the second lens.

In another embodiment, a system is provided. The system includes a stage having a substrate support surface. The stage is coupled to a stage actuator configured to move the stage in a scanning path and rotate the stage about an axis. The system further includes an optical arm coupled to an arm actuator configured to scan the optical arm and rotate the optical arm about the axis. The optical arm includes a light source. The light source emits a light path operable to be diffracted to the stage. The optical arm further includes a dove prism positioned in the light path. The dove prism includes an actuator to rotate the dove prism. The optical arm further includes a first beam splitter positioned in the light path. The first beam splitter directs the light path through a first lens and a second beam splitter directs the light path through a second lens. The optical arm further includes a first detector operable to detect the light path from the first lens.

In yet another embodiment, a system is provided. The system includes a stage having a substrate support surface. The stage is coupled to a stage actuator configured to move the stage in a scanning path and rotate the stage about an axis. An optical arm coupled to an arm actuator is configured to scan the optical arm and rotate the optical arm about the axis. The optical arm includes a light source. The light source emits a light path operable to be diffracted to the stage. A first beam splitter and a second beam splitter are positioned in the light path. The first beam splitter directs the light path through a first lens and the second beam splitter directs the light path through a first dove prism. The optical arm further includes a first mirror operable to direct the light path to a second mirror and the second mirror directs the light path through the first lens. The optical arm further includes a first detector operable to detect the light path from the first lens.

In yet another embodiment, a method is provided. The method includes determining a fixed beam angle $\vartheta_0$ and an initial orientation angle $\phi_{initial}$ of a first zone of optical device structures of a substrate. The method further includes rotating the substrate to position the initial orientation angle $\phi_{initial}$ perpendicular to light beams to be projected to the first zone of the substrate. The method further includes projecting light beams having a wavelength ($\lambda_{laser}$) to the first zone of the substrate at the fixed beam angle $\vartheta_0$. The method further includes measuring a reflected beam angle $\vartheta_{reflected}$ of the light beams reflected by the substrate. The reflected beam angle $\vartheta_{reflected}$ is obtained via a center of a symmetric beam profile. The symmetric beam profile is obtained from a combination of a first image and a second image of the light beams reflected by the substrate. The second image is rotated at a rotation angle different than the first image. The method further includes determining a pitch P of the optical device structures by a pitch equation $P=\lambda_{laser}/(\sin \vartheta_0 + \sin \vartheta_{reflected})$.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present disclosure relate to devices and methods of measuring a pitch P of optical device structures and an orientation angle φ of the optical device structures. In one embodiment, a system is provided. The system includes a stage having a substrate support surface. The stage is coupled to a stage actuator configured to move the stage in a scanning path and rotate the stage about an axis. The system further includes an optical arm coupled to an arm actuator configured to scan the optical arm and rotate the optical arm about the axis. The optical arm includes a light source. The light source emits a light path operable to be diffracted to the stage. The optical arm further includes a first beam splitter and a second beam splitter positioned in the light path. The first beam splitter directs the light path through a first lens and the second beam splitter directs the light path through a first dove prism and a second lens. The optical arm further includes a first detector operable to detect the light path from the first lens and second detector operable to detect the light path from the second lens.

The measurement system includes a stage, an optical arm, and a detector arm. Light projected from the optical arm reflects from a substrate disposed on the stage, and the reflected light from the substrate surface is incident on the detector and the optical arm. The deflection from the optical center of the focusing lens is used to determine the local non-uniformity of the optical device. Methods of diffracting light include measuring scattered light beams from the substrate surface, and local distortions are obtained from the measured values. Non-opaque substrates will cause interference due to diffraction of the light from other surfaces. The interferences will be diffracted to the optical arm and the detector arm. The interference causes the accuracy and the precision of the measurement results to decrease.

Figure 1:
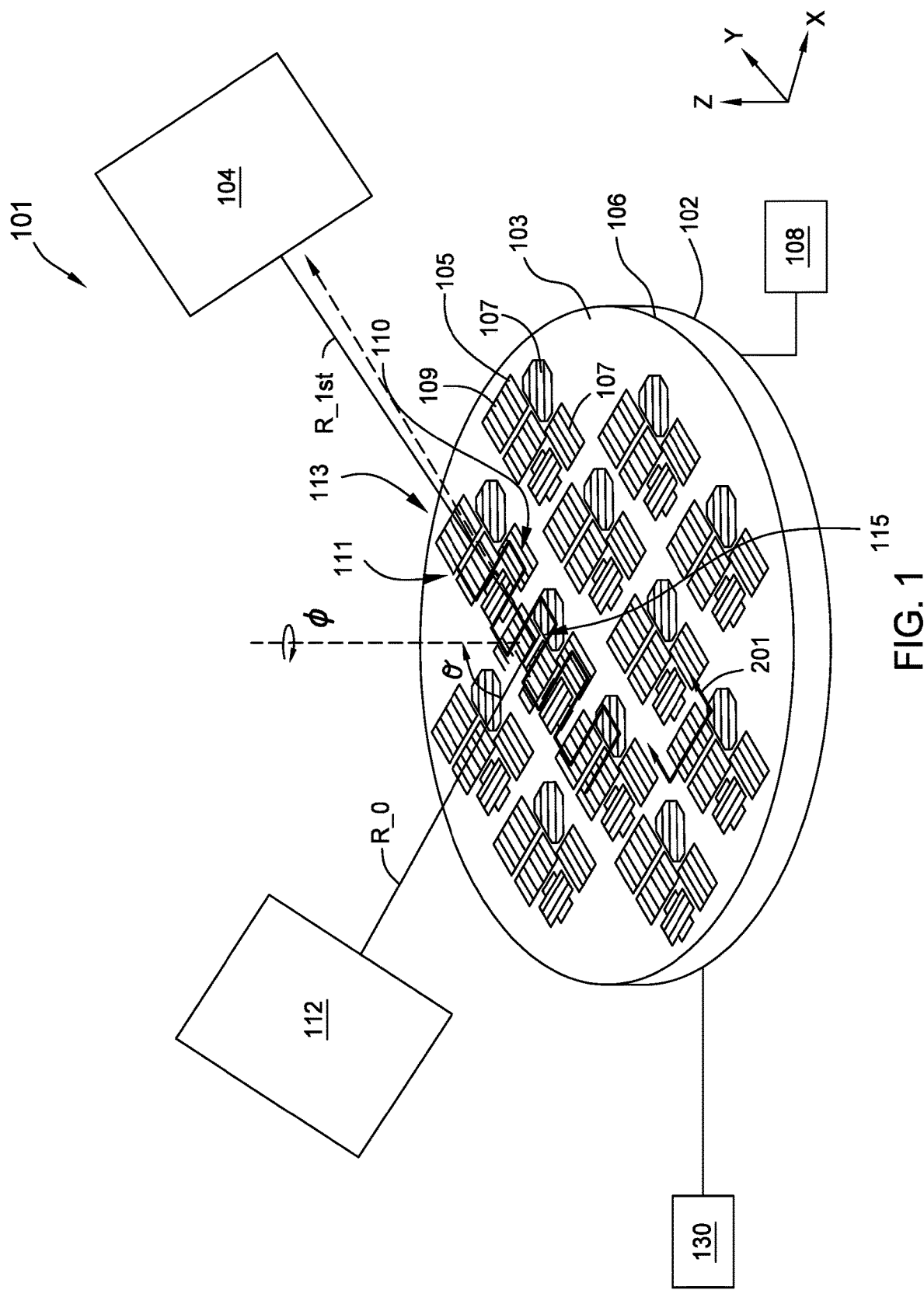
FIG. 1 is a schematic view of a measurement system, according to embodiments.

FIG. 1 is a schematic view of a measurement system 101, according to one embodiment. As shown, the measurement system 101 includes a stage 102, an optical arm 104, and a detector arm 112. The measurement system 101 is configured to diffract light projected by the optical arm 104. The light projected by the optical arm 104 is directed at a substrate 103 disposed over the stage 102. The light that is reflected and diffracted from the substrate 103 is incident on the detector arm 112 and the optical arm 104. In one embodiment, which can be combined with other embodiments described herein, the measurement system 101 includes the optical arm 104 and the detector arm 112. In another embodiment, which can be combined with other embodiments described herein, the measurement system 101 includes only the optical arm 104.

As shown, the stage 102 includes a support surface 106 and a stage actuator 108. The stage 102 is configured to retain the substrate 103 on the support surface 106. The stage 102 is coupled to the stage actuator 108. The stage actuator 108 is configured to move the stage 102 in a scanning path 110 along an x-direction and a y-direction, and rotate the stage 102 about a z-axis. The stage 102 is configured to move and rotate the substrate 103 such that light projected from the optical arm 104 is incident on different portions or gratings of the substrate 103 during operation of the measurement system 101.

The substrate 103 includes one or more optical devices 105 having one or more gratings 107 of optical device structures 109. Each of the gratings 107 includes regions of optical device structures 109. The optical device structures 109 have an orientation angle φ and a pitch P. The pitch P is defined as a distance between adjacent points, such as adjacent first edges or adjacent center of masses of the optical device structures 109. The pitch P and the orientation angle φ of the optical device structures 109 for a first grating 111 can be different than the pitch P and the orientation angle φ of the optical device structures 109 for a second grating 113 of the one or more gratings 107. In addition, there can be local pitch P' variations and local orientation angle φ' variations of the optical devices structures 109 due to local warping or other deformation of the substrate 103. The measurement system 101 can be utilized to measure the pitch P and the orientation angle φ of the optical device structures 109 for each of the gratings 107 of each of the optical devices 105. The substrate 103 can be a single crystal wafer of any size, such as having a radius from about 150 mm to about 450 mm.

The optical arm 104, the detector arm 112, and the stage 102 are coupled to a controller 130. The controller 130 facilitates the control and automation of the method for measuring the pitch P and the orientation angle φ of optical device structures 109 described herein. The controller may include a central processing unit (CPU) (not shown), memory (not shown), and support circuits (or I/O) (not shown). The CPU may be one of any form of computer processors that are used in industrial settings for controlling various processes and hardware (e.g., motors and other hardware) and monitor the processes (e.g., transfer device position and scan time). The memory (not shown) is connected to the CPU, and may be a readily available memory, such as random access memory (RAM). Software instructions and data can be coded and stored within the memory for instructing the CPU. The support circuits (not shown) are also connected to the CPU for supporting the processor in a conventional manner. The support circuits may include conventional cache, power supplies, clock circuits, input/output circuitry, subsystems, and the like. A program (or computer instructions) readable by the controller determines which tasks are performable on the substrate 103. The program may be software readable by the controller and may include code to monitor and control, for example, substrate position and optical arm position.

FIGS. 2A-2F are schematic views of configurations 200A-200F of a measurement system 101. In embodiments where the substrate 103 is non-opaque, which can be combined with other embodiments described herein, reflections and diffractions of light from multiple surfaces of the substrate 103 will cause interference on the optical arm 104 and the detector arm 112. The interference is non-symmetric i.e., the image of the light path diffracted or reflected off the substrate 103 is not circular or substantially circular on a first detector 208 and a plurality of second detectors 218, as further described below, of the optical arm 104 and the detector arm 112. To address this, the measurement system 101 utilizes prisms, such as a dove prism to rotate the image. Multiple images are combined to generate a symmetric beam i.e., a circular beam. The centroid of the beam is determined with image processing algorithms. The image processing algorithms may be at least partially executed by a controller 130.

Figure 2A:
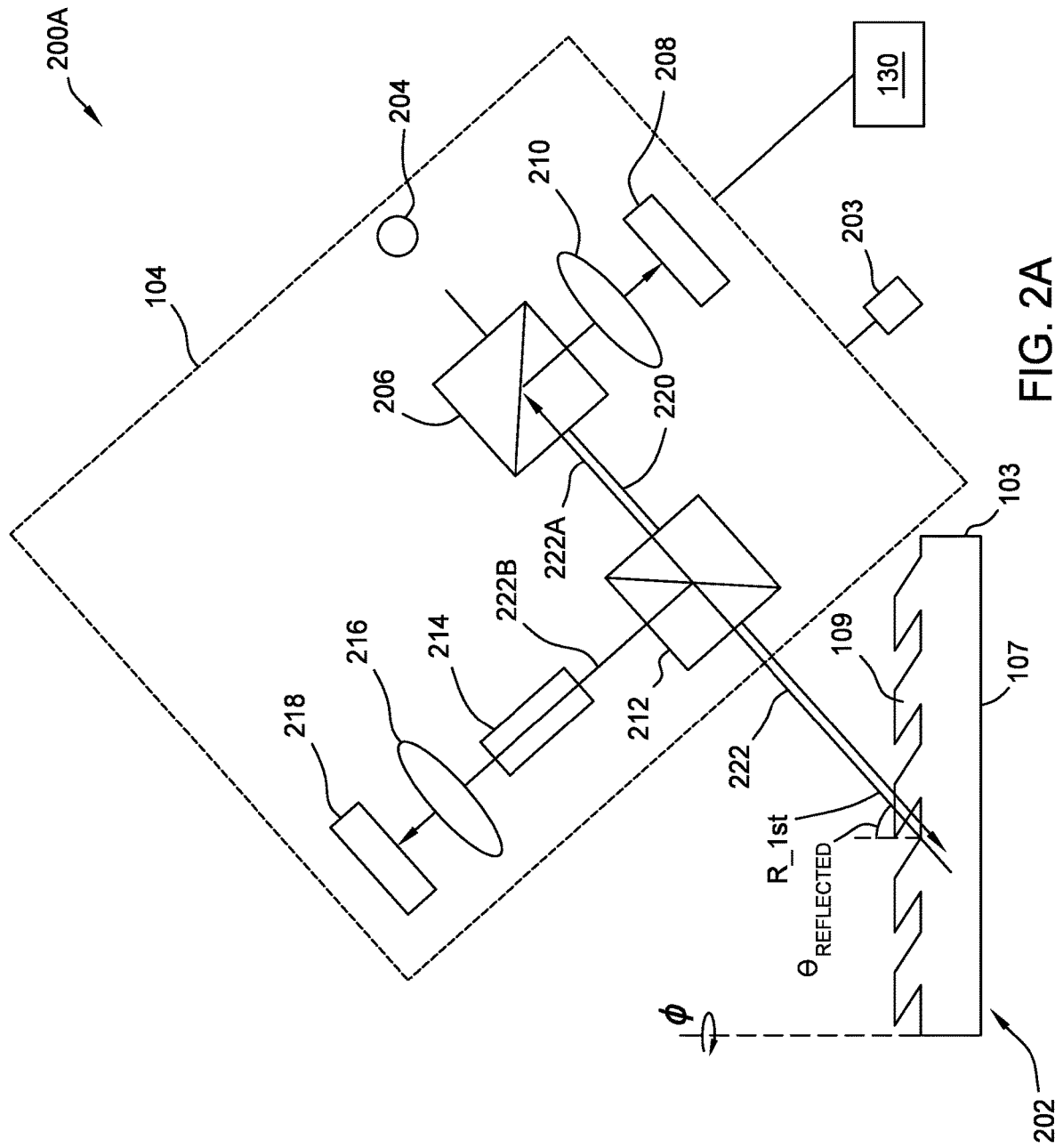
FIGS. 2A-2F are schematic views of a configuration of a measurement system, according to some embodiments.

FIG. 2A is a schematic view of a configuration 200A of a measurement system 101. The configuration 200A includes a portion 202 of a section line 201 (shown in FIG. 1) across a substrate 103. The substrate 103 has one or more gratings 107 of optical device structures 109. As shown, an optical arm 104 includes a light source 204, a first beam splitter 206, a second beam splitter 212, a first detector 208, a second detector 218, a first dove prism 214, a first lens 210, and a second lens 216. The optical arm 104 is in communication with the controller 130. The optical arm 104 can include an arm actuator 203. The arm actuator 203 is configured to rotate the optical arm 104 about the z-axis and scan the optical arm in a z-direction. The optical arm 104 can be fixed while the measurement is performed.

The first beam splitter 206 is positioned in a first light path 220 adjacent to the light source 204. In one embodiment, which can be combined with other embodiments described herein, the first light path 220 has a circular or substantially circular cross-section. The light beams described herein can be laser beams. The light source 204 is operable to project light at a beam angle θ (shown in FIG. 1) along the first light path 220 to the substrate 103, according to one embodiment. The light source 204 is operable to project a collimated beam of light. The first light path 220 is incident on the substrate 103 and diffracts a second light path 222 back to the optical arm 104. The optical arm 104 delivers the first light path 220 such that the light can be diffracted by the substrate 103 and form the second light path 222. In one embodiment, which can be combined with other embodiments described herein, the second light path 222 is a first order diffraction. The second light path 222 is split by the second beam splitter 212 into the second light path 222A and the second light path 222B.

The first beam splitter 206 is operable to deflect the second light path 222A diffracted by the substrate 103 to the first detector 208. The first lens 210 is positioned between the first beam splitter 206 and the first detector 208. The first lens 210 is configured to focus the second light path 222A onto the first detector 208. A first image of the second light path 222A is projected on the first detector 208. The first detector 208 is any optical apparatus used in the art to detect light, such as a charge-coupled device (CCD) array or an active-pixel sensor (CMOS array).

The second beam splitter 212 is operable to deflect the second light path 222B diffracted by the substrate 103 to the second detector 218. The second lens 216 is positioned between the second beam splitter 212 and the second detector 218. The second lens 216 is configured to focus the second light path 222B onto the second detector 218. Prior to contacting the second detector 218, the second light path 222B passes through the first dove prism 214. The first dove prism 214 rotates the image of the second light path 222B on the second detector 218. Therefore, a second image of the second light path 222B is projected on the second detector 218. The second image is at a rotation angle different than the first image. The first dove prism 214 is operable to rotate the second image at any angle. In one embodiment, which can be combined with other embodiments described herein, the second image is rotated 180° from the first image. The second detector 218 is any optical apparatus used in the art to detect light, such as a CCD array or a CMOS array.

Figure 2B:
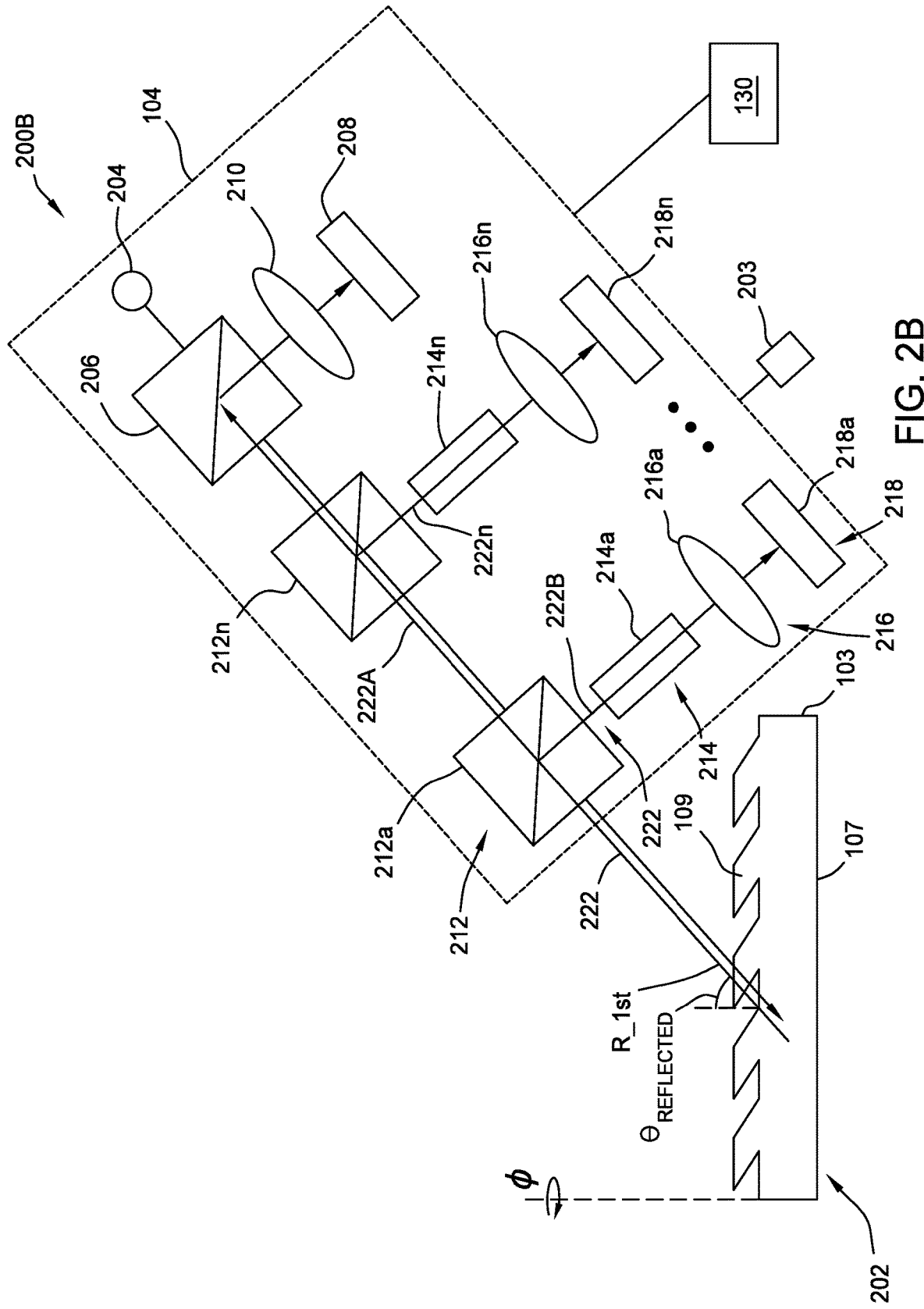

FIG. 2B is a schematic view of a configuration 200B of a measurement system 101. The configuration 200B includes a portion 202 of a section line 201 (shown in FIG. 1) across a substrate 103. The substrate 103 has one or more gratings 107 of optical device structures 109. As shown, the optical arm 104 includes a light source 204, a first beam splitter 206, a second beam splitter 212*a*, . . . 212*n* (collectively referred to as the "plurality of second beam splitters 212"), a first detector 208, a second detector 218*a*, . . . 128*n* (collectively referred to as the "plurality of second detectors 218"), a first dove prism 214*a*, . . . 214*n* (collectively referred to as the "plurality of first dove prisms 214"), a first lens 210, and a second lens 216*a*, . . . 216*n* (collectively referred to as the "plurality of second lenses 216"). The optical arm 104 is in communication with the controller 130. The optical arm 104 can include an arm actuator 203. The arm actuator 203 is configured to rotate the optical arm 104 about the z-axis and scan the optical arm in a z-direction. The optical arm 104 can be fixed while the measurement is performed.

The first beam splitter 206 is positioned in a first light path 220 adjacent to the light source 204. The light source 204 is operable to project light at a beam angle θ (shown in FIG. 1) along the first light path 220 to the substrate 103, according to one embodiment. The first light path 220 is incident on the substrate 103 and projects a second light path 222 to the optical arm 104. The optical arm 104 delivers the first light path 220 such that the light can be diffracted by the substrate 103 and form the second light path 222. The second light path 222 is split by the plurality of second beam splitters 212 into the second light paths 222*a* . . . 222*n* (collectively referred to as the "plurality of second light paths 222").

The first beam splitter 206 is operable to deflect the second light path 222A diffracted by the substrate 103 to the first detector 208. The first lens 210 is positioned between the first beam splitter 206 and the first detector 208. The first lens 210 is configured to focus the second light path 222A onto the first detector 208. A first image of the second light path 222A is projected on the first detector 208.

The plurality of second beam splitters 212 are operable to deflect the plurality of second light paths 222B, . . . 222*n* diffracted by the substrate 103 to the plurality of second detectors 218. The plurality of second lenses 216 are positioned between the plurality of second beam splitters 212 and the plurality of second detectors 218. The plurality of second lenses 216 are configured to focus the second light paths 222B, . . . 212*n* onto the plurality of second detectors 218. Prior to contacting the plurality of second detectors 218, the second light paths 222B, . . . 222*n* pass through the plurality of first dove prisms 214. The plurality of first dove prisms 214 rotate the image of each of the second light paths 222B, . . . 222*n* on the plurality of second detectors 218. Therefore, a second image from of each of the second light paths 222B, . . . 222*n* is diffracted on the plurality of second detectors 218. The plurality of second images are at a rotation angle different than the first image. In one embodiment, which can be combined with other embodiments described herein, two second images are rotated 120° from the first image, such that the second images are at 120° and 240°. In another embodiment, which can be combined with other embodiments described herein, each second image of the plurality of second images is rotated 360°/n from the first image, where n is the number of images detected by the plurality of second detectors 218.

Figure 2C:
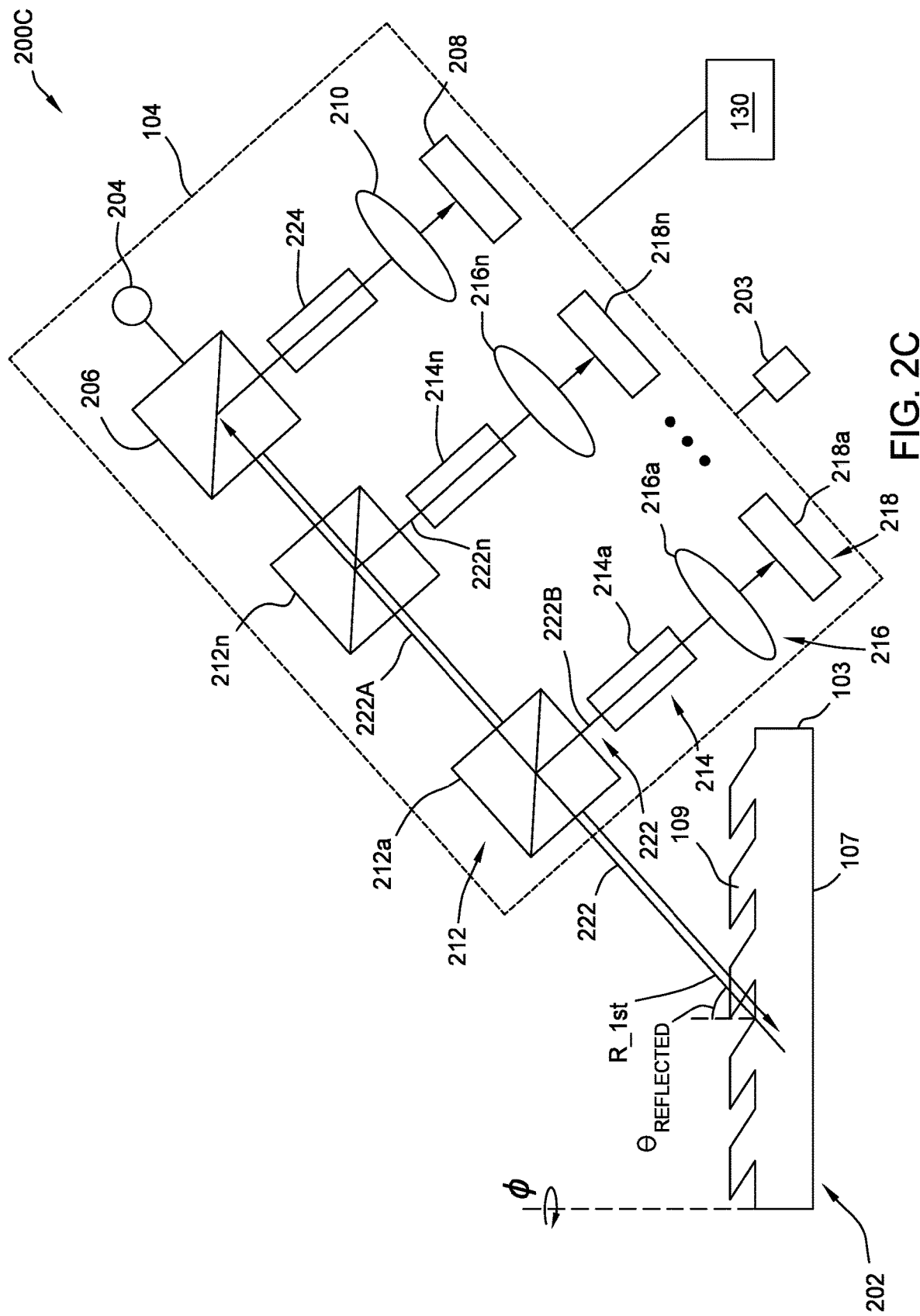

FIG. 2C is a schematic view of a configuration 200C of a measurement system 101. The configuration 200C includes a portion 202 of a section line 201 across a substrate 103. The substrate 103 has one or more gratings 107 of optical device structures 109. As shown, the optical arm 104 includes a light source 204, a first beam splitter 206, a second beam splitter 212a, . . . 212n (collectively referred to as the "plurality of second beam splitters 212"), a first detector 208, a second detector 218a, . . . 128n (collectively referred to as the "plurality of second detectors 218"), a first dove prism 214a, . . . 214n (collectively referred to as the "plurality of first dove prisms 214"), a second dove prism 224, a first lens 210, and a second lens 216a, . . . 216n (collectively referred to as the "plurality of second lenses 216"). The optical arm 104 is coupled to the controller 130. The optical arm 104 can include an arm actuator 203, and the arm actuator 203 is configured to rotate the optical arm 104 about the z-axis and scan the optical arm in a z-direction. The optical arm 104 can be fixed while the measurement is performed.

The first beam splitter 206 is positioned in a first light path 220 adjacent to the light source 204. The light source 204 is operable to project light at a beam angle θ (shown in FIG. 1) along the first light path 220 to the substrate 103, according to one embodiment. The first light path 220 is incident on the substrate 103 and diffracts a second light path 222 to the optical arm 104. The optical arm 104 delivers the first light path 220 such that the light can be diffracted by the substrate 103 and form the second light path 222. The second light path 222 is split by the second beam splitter 212 i.e., into the plurality of second light paths 222A, 222B, . . . 222n.

The first beam splitter 206 is operable to deflect the second light path 222A diffracted by the substrate 103 to the first detector 208. The first lens 210 is positioned between the first beam splitter 206 and the first detector 208. The first lens 210 is configured to focus the second light path 222A onto the first detector 208. Prior to contacting the first detector 208, the second light paths 222A passes through the second dove prism 224. The second dove prism 224 rotates the image of the second light path 222A on the first detector 208. Therefore, a first image of the second light path 222A is projected on the first detector 208. The first image of the second light path 22A may be rotated to any angle by the second dove prism 224.

The plurality of second beam splitters 212 are operable to deflect the plurality of second light paths 222B, . . . 222n diffracted by the substrate 103 to the plurality of second detectors 218. The plurality of second lenses 216 are positioned between the plurality of second beam splitters 212 and the plurality of second detectors 218. The plurality of second lenses 216 are configured to focus the second light paths 222B, . . . 212n onto the plurality of second detectors 218. Prior to contacting the plurality of second detectors 218, the second light paths 222B, . . . 222n pass through the plurality of first dove prisms 214. The plurality of first dove prisms 214 rotate the image of each of the second light paths 222B, . . . 222n on the plurality of second detectors 218. Therefore, a second image of each of the second light paths 222B, . . . 222n is projected on the plurality of second detectors 218. The plurality of second images are at a rotation angle different than the first image. In one embodiment, which can be combined with other embodiments described herein, two second images are rotated 120° from the first image, such that the second images are at 120° and 240°. In another embodiment, which can be combined with other embodiments described herein, each second image of the plurality of second images is rotated 360°/n from the first image, where n is the number of images detected by the second detector 218.

Figure 2D:
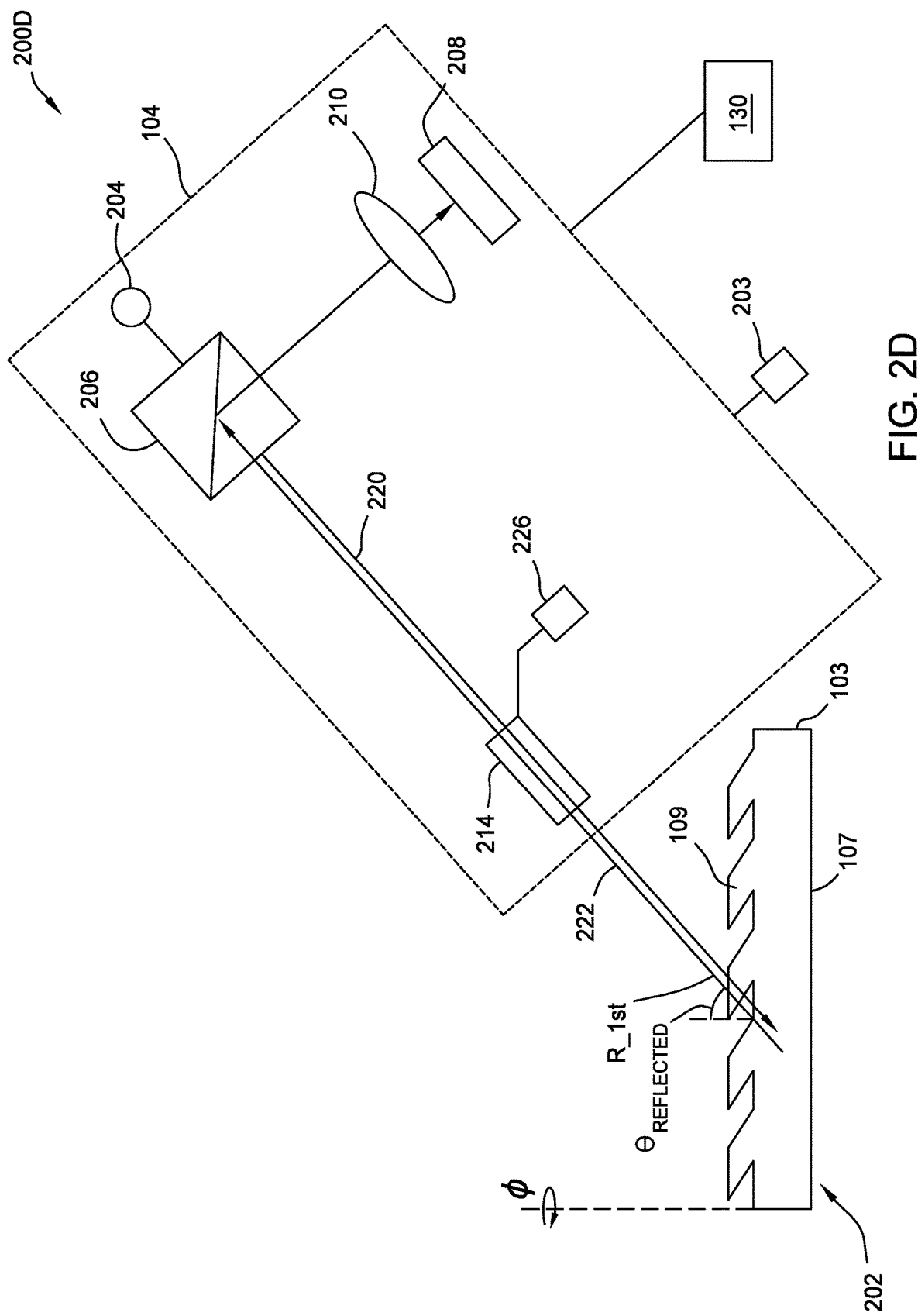

FIG. 2D is a schematic view of a configuration 200D of a measurement system 101. The configuration 200D includes a portion 202 of a section line 201 across a substrate 103. The substrate 103 has one or more gratings 107 of optical device structures 109. As shown, an optical arm 104 includes a light source 204, a first beam splitter 206, a first detector 208, a first dove prism 214, and a first lens 210. The optical arm 104 is coupled to the controller 130. The optical arm 104 can include an arm actuator 203, and the arm actuator 203 is configured to rotate the optical arm 104 about the z-axis and scan the optical arm in a z-direction. The optical arm 104 can be fixed while the measurement is performed.

The first beam splitter 206 is positioned in a first light path 220 adjacent to the light source 204. In one embodiment, which can be combined with other embodiments described herein, the first light path 220 has a circular or substantially circular cross-section. The light source 204 is operable to project light at a beam angle θ (shown in FIG. 1) along the first light path 220 to the substrate 103, according to one embodiment. The first light path 220 is incident on the substrate 103 and diffracts a second light path 222 to the optical arm 104. The optical arm 104 delivers the first light path 220 such that the light can be diffracted by the substrate 103 and form the second light path 222. In one embodiment, which can be combined with other embodiments described herein, the second light path 222 is a first order diffraction.

The first beam splitter 206 is operable to deflect the second light path 222 diffracted by the substrate 103 to the first detector 208. The first lens 210 is positioned between the first beam splitter 206 and the first detector 208. The first lens 210 is configured to focus the second light path 222 onto the first detector 208. A first image of the second light path 222A is projected on the first detector 208. Prior to contacting the first beam splitter 206, the second light path 222 passes through the first dove prism 214. The first dove prism 214 rotates the image of the second light path 222 on the first detector 208. Therefore, a first image of the second light path 222 is diffracted on the first detector 208. In one embodiment, which can be combined with other embodiments described herein, the first dove prism 214 is coupled to a dove prism actuator 226. The dove prism actuator is operable to rotate the first dove prism 214 such that multiple images, such as a first image and a plurality of second images of the second light path 222 can be projected onto the first detector 208. In one embodiment, which can be combined with other embodiments described herein, the plurality of second images are 90° from the first image, such that each of the second images are at 90°, 180°, and 270°. In another embodiment, which can be combined with other embodiments described herein, each second image of the plurality of second images is rotated 360°/n from the first image, where n is the number of images detected by the second detector 218.

Figure 2E:
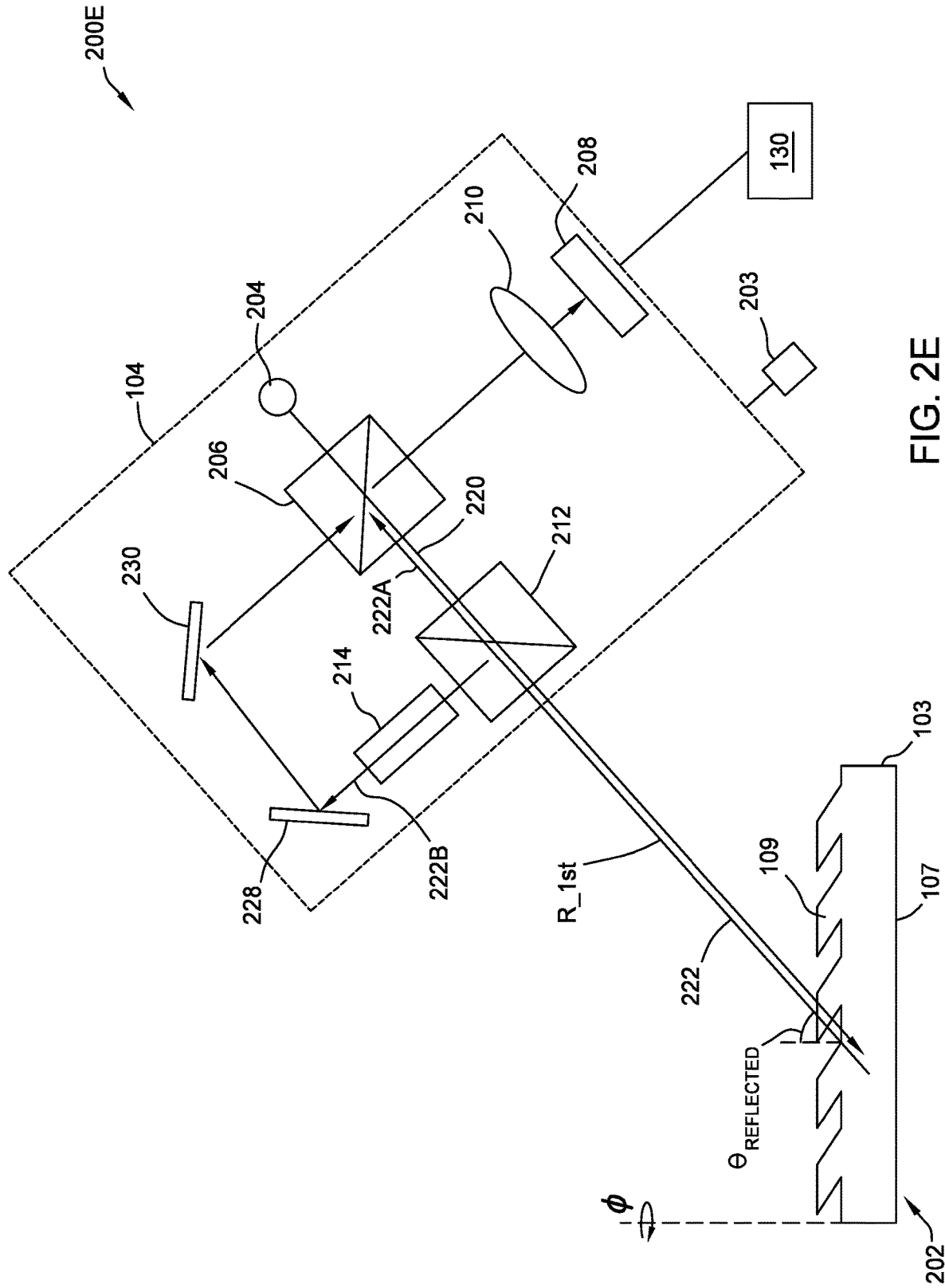

FIG. 2E is a schematic view of a configuration 200E of a measurement system 101. The configuration 200E includes a portion 202 of a section line 201 across a substrate 103. The substrate 103 has one or more gratings 107 of optical device structures 109. As shown, an optical arm 104 includes a light source 204, a first beam splitter 206, a second beam splitter 212, a first detector 208, a first dove prism 214, a first mirror 228, a second mirror 230, and a first lens 210. The optical arm 104 is coupled to the controller 130. The optical arm 104 can include an arm actuator 203, and the arm actuator 203 is configured to rotate the optical arm 104 about the z-axis and scan the optical arm in a z-direction. The optical arm 104 can be fixed while the measurement is performed.

The first beam splitter 206 is positioned in a first light path 220 adjacent to the light source 204. In one embodiment, which can be combined with other embodiments described herein, the first light path 220 has a circular or substantially circular cross-section. The light beams described herein can be laser beams. The light source 204 is operable to project light at a beam angle θ (shown in FIG. 1) along the first light path 220 to the substrate 103, according to one embodiment. The first light path 220 is incident on the substrate 103 and diffracts a second light path 222 to the optical arm 104. The optical arm 104 delivers the first light path 220 such that the light can be diffracted by the substrate 103 and form the second light path 222. In one embodiment, which can be combined with other embodiments described herein, the second light path 222 is a first order diffraction. The second light path 222 is split by the second beam splitter 212 i.e., into the second light path 222A and the second light path 222B.

The first beam splitter 206 is operable to deflect the second light path 222A diffracted by the substrate 103 to the first detector 208. The first lens 210 is positioned between the first beam splitter 206 and the first detector 208. The first lens 210 is configured to focus the second light path 222A onto the first detector 208. A first image of the second light path 222A is projected on the first detector 208.

The second beam splitter 212 is operable to deflect the second light path 222B diffracted by the substrate 103 to the first mirror 228. The second light path 222B reflects off the first mirror 228 to the second mirror 230. The second light path 222B diffracts to the first lens 210. The first lens 210 is configured to focus the second light path 222B onto the first detector 208. Prior to contacting the first mirror 228, the second light path 222B passes through the first dove prism 214. The first dove prism 214 rotates the image of the second light path 222B on the first detector 208. Therefore, a second image of the second light path 222B is projected on the first detector 208 such that the first detector 208 detects the first image and the second image. In one embodiment, which can be combined with other embodiments described herein, the second image is rotated 180° from the first image.

Figure 2F:
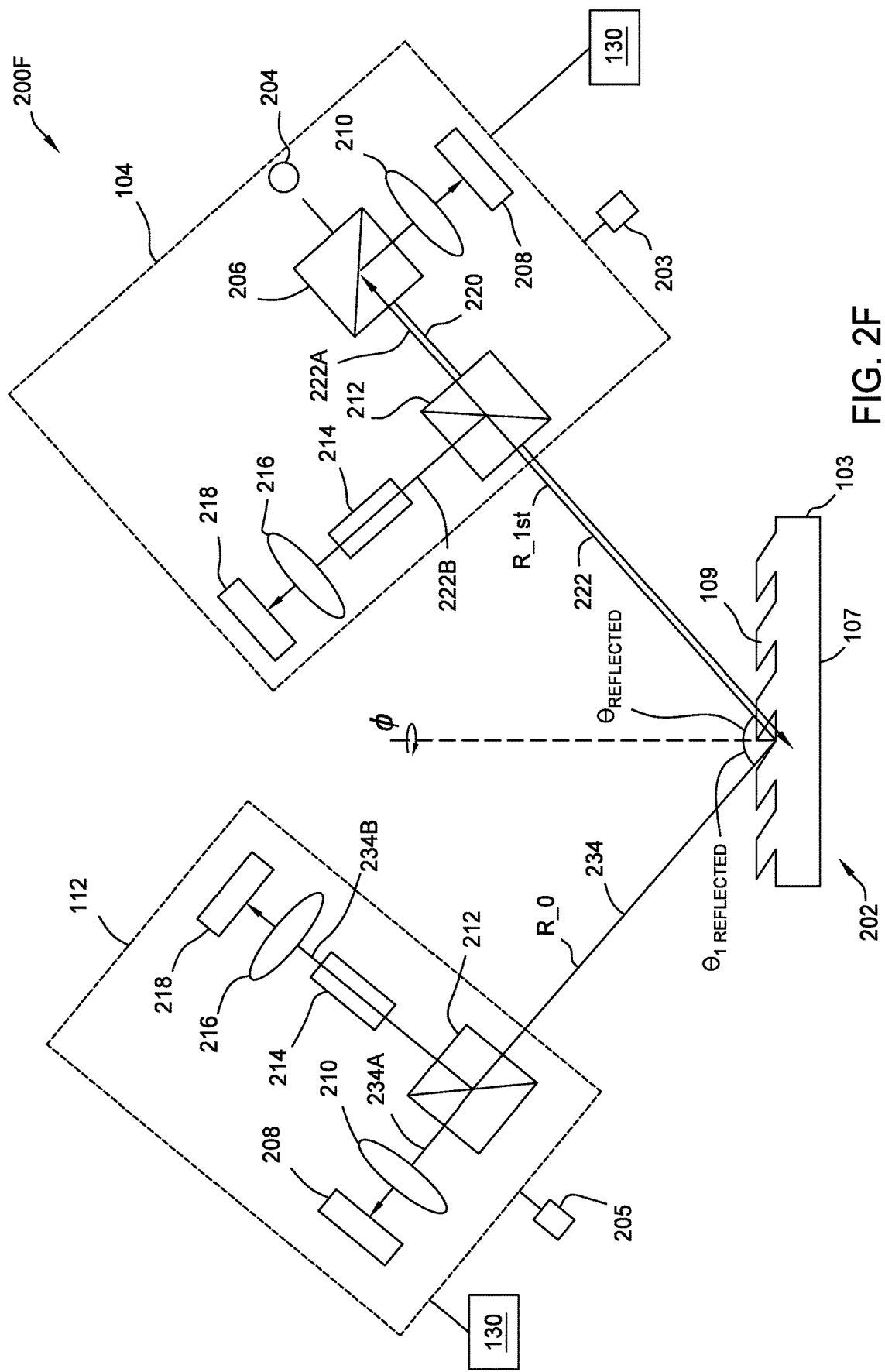

FIG. 2F is a schematic view of a configuration 200F of a measurement system 101. The configuration 200F includes a portion 202 of a section line 201 across a substrate 103. The substrate 103 has one or more gratings 107 of optical device structures 109.

As shown, an optical arm 104 includes a light source 204, a first beam splitter 206, a second beam splitter 212, a first detector 208, a second detector 218, a first dove prism 214, a first lens 210, and a second lens 216. The optical arm 104 is coupled to the controller 130. The optical arm 104 can include an arm actuator 203, and the arm actuator 203 is configured to rotate the optical arm 104 about the z-axis and scan the optical arm in a z-direction. The optical arm 104 can be fixed while the measurement is performed. The configuration 200F illustrates the optical arm 104 of the configuration 200A of the measurement system 101. Although the optical arm 104 of the configuration 200A is shown in FIG. 2F, any of the optical arms 104 of the configurations 200A-200E can be included in the configuration 200F.

The configuration 200F further includes a detector arm 112. The detector arm 112 is operable to measure a reflection light path 234. The reflection light path 234 is a direct reflection of the first light path 220. The first light path 220 is incident on the substrate 103 and diffracts the reflection light path 234 to the detector arm 112.

In one embodiment, which can be combined with other embodiment described herein, the detector arm 112 includes a second beam splitter 212, a first detector 208, a second detector 218, a first dove prism 214, a first lens 210, and a second lens 216. The detector arm 112 can include a detector arm actuator 205, and the detector arm actuator 205 is configured to rotate the detector arm 112 about the z-axis and scan the optical arm in a z-direction. The detector arm 112 can be fixed while the measurement is performed. The detector arm 112 can have similar configurations to the optical arms 104 of the configurations 200A-200E.

The reflection light path 234 is split by the second beam splitter 212 i.e., into the reflection light path 234A and the reflection light path 234B. The reflection light path 234A diffracted by the substrate 103 is diffracted to the first detector 208. The first lens 210 is positioned between the first beam splitter 206 and the first detector 208. The first lens 210 is configured to focus the reflection light path 234A onto the first detector 208. A first image of the reflection light path 234A is projected on the first detector 208. The first detector 208 is any optical apparatus used in the art to detect light, such as a CCD array or a CMOS array.

The second beam splitter 212 is operable to deflect the reflection light path 234B diffracted by the substrate 103 to the second detector 218. The second lens 216 is positioned between the second beam splitter 212 and the second detector 218. The second lens 216 is configured to focus the reflection light path 234B onto the second detector 218. Prior to contacting the second detector 218, the reflection light path 234B passes through the first dove prism 214. The first dove prism 214 rotates the image of the reflection light path 234B on the second detector 218. Therefore, a second image of the reflection light path 234B is projected on the second detector 218. The second detector 218 is any optical apparatus used in the art to detect light, such as a CCD array or a CMOS array.

Figure 3C:
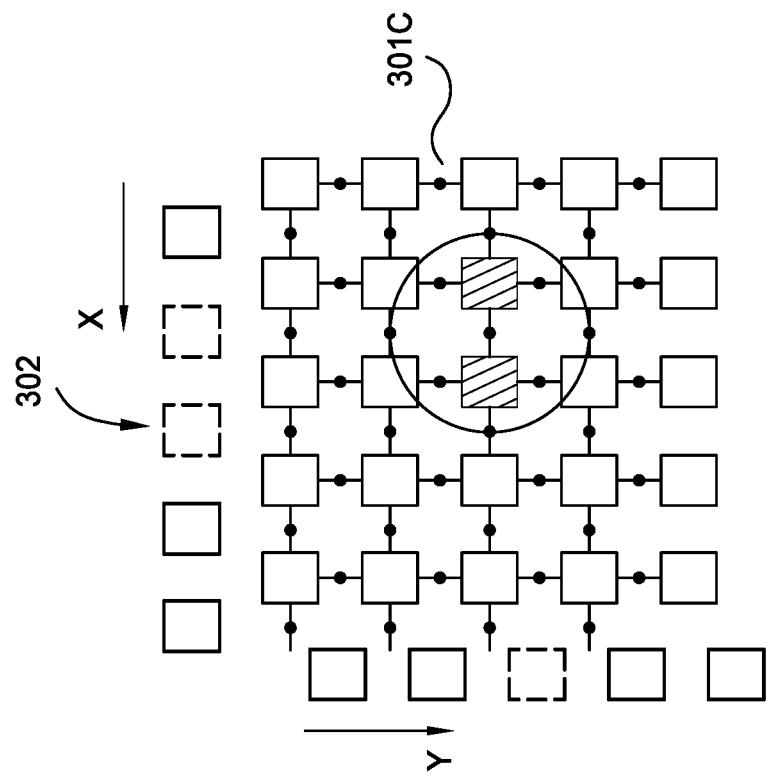
FIGS. 3A-3C are schematic views of a detector, according to embodiments.
Figure 3A:
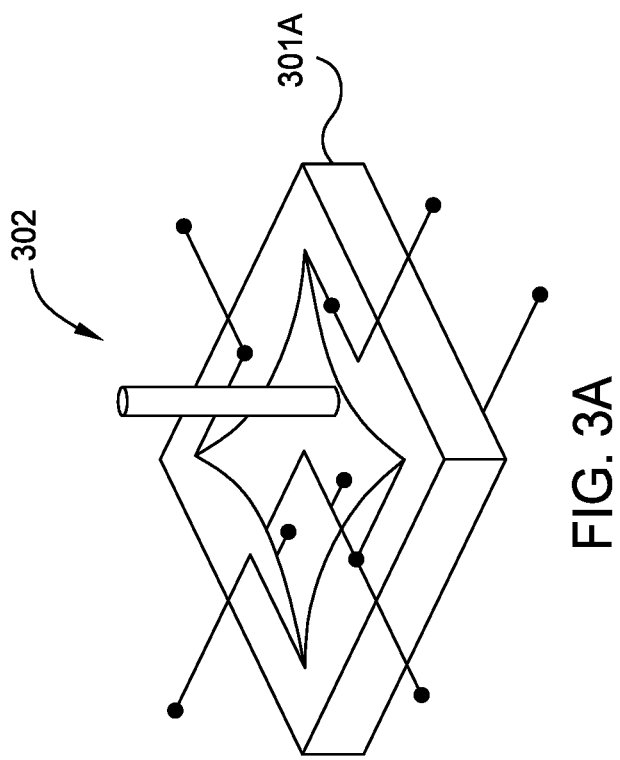
Figure 3B:
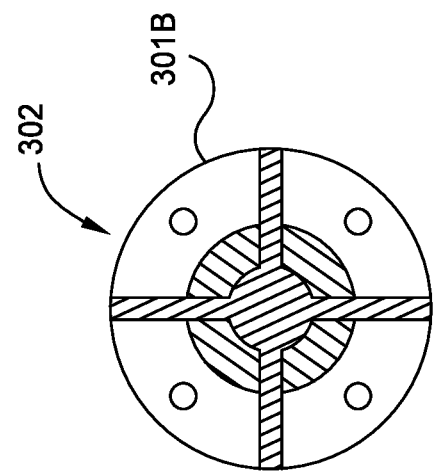

FIG. 3A illustrates a detector 302 as a position sensitive detector 301A, i.e., a lateral sensor, according to one embodiment. The detector 302 can be any detector such as the first detector 208 and the second detector 218 of the configurations 200A-200F. FIG. 3B illustrates the detector 302 as a quadrant sensor 301B, according to one embodiment. FIG. 3C illustrates the detector 302 as an image sensor array 301C, such as a CCD array or a CMOS array, according to some embodiments.

Figure 3D:
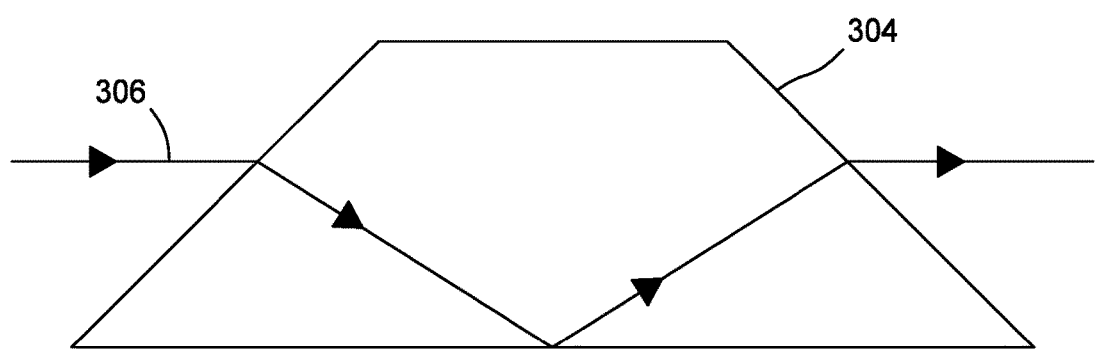
FIG. 3D is a schematic view of a dove prism, according to embodiments.

FIG. 3D is a schematic view of a dove prism 304, such as the first dove prism 214 and the second dove prism 224. A light path 306 such as the plurality of second light paths 222A, 222B, . . . 222n and the reflection light path 234B can pass through the dove prism 304. The light path 306 travels through the dove prism 304 such that the light path 306 is rotated as desired.

Figure 3E:
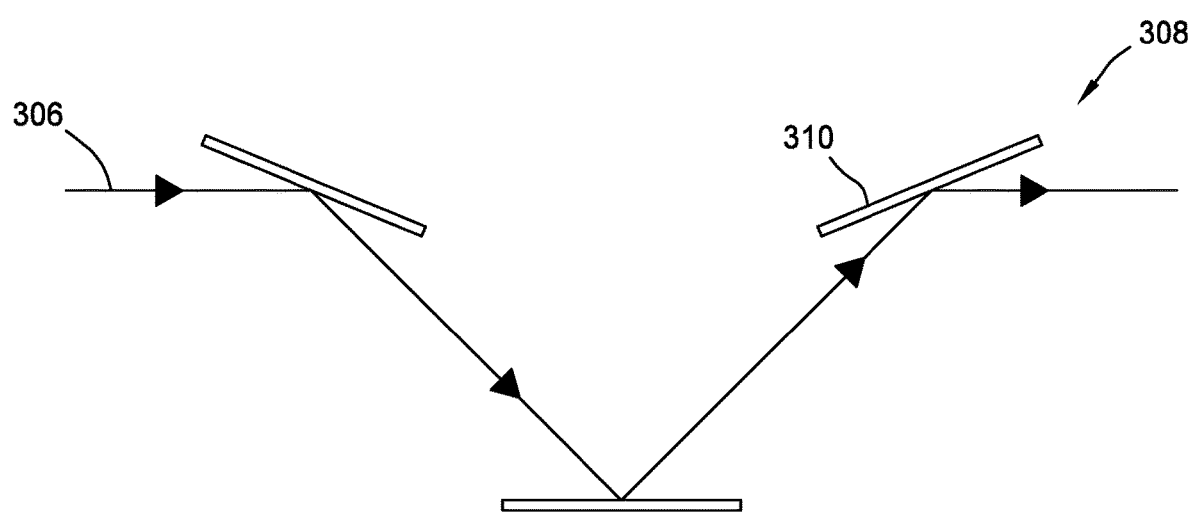
FIG. 3E is a schematic view of a mirror assembly, according to embodiments.

FIG. 3E is a schematic view of a mirror assembly 308. In one embodiment, which can be combined with other embodiments described herein, the mirror assembly 308 can replace the dove prism 304. The mirror assembly 308 includes a plurality of mirrors 310. The light path 306 travels through the mirror assembly 308 such that the light path 306 is rotated by reflecting between the plurality of mirrors 310.

Figure 4:
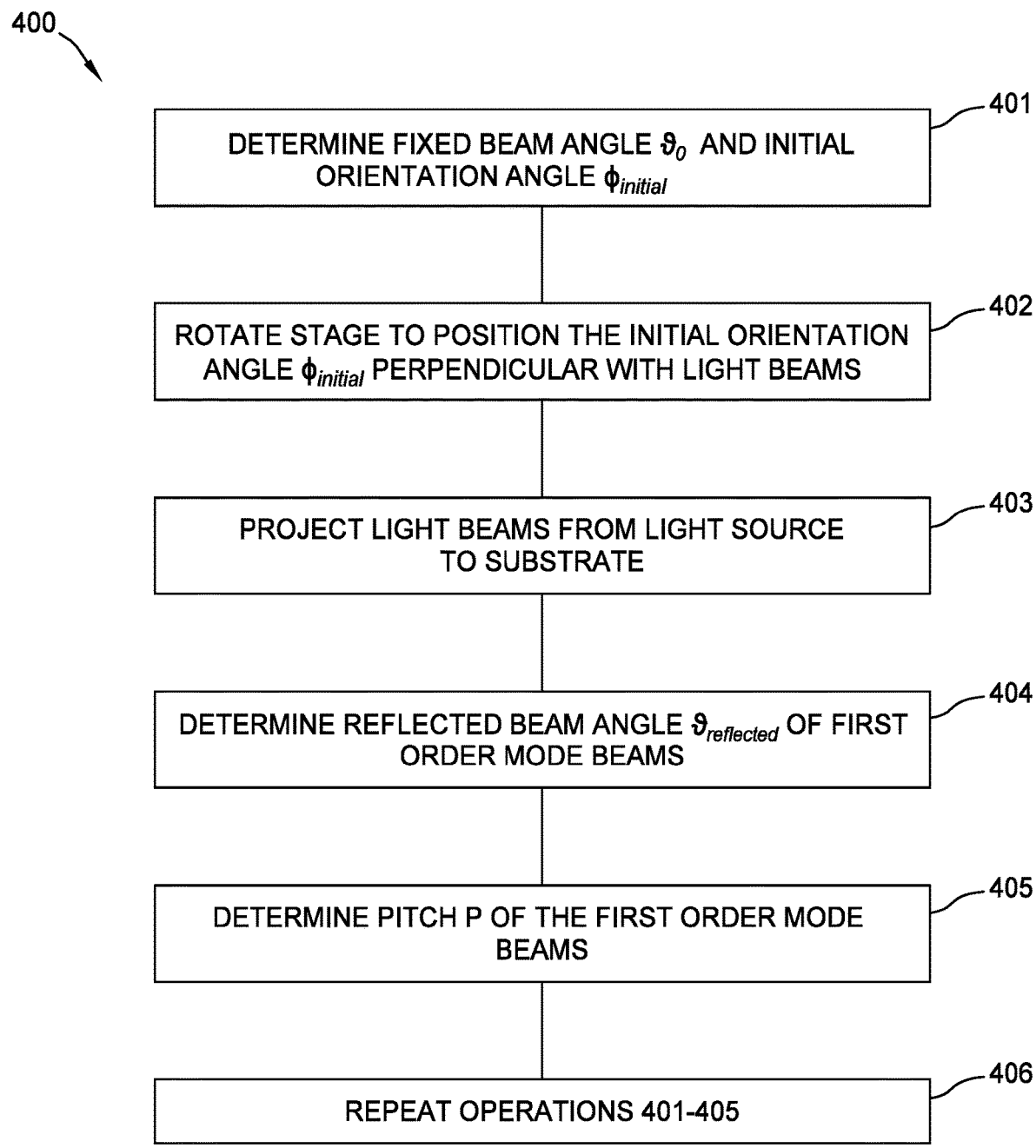
FIG. 4 is a flow diagram of a method for measuring a pitch P of optical device structures and an orientation angle φ of the optical device structures, according to embodiments.

FIG. 4 is a flow diagram of a method 400 for measuring a pitch P of optical device structures 109 and an orientation angle ϕ of optical device structures 109. To facilitate explanation, the method 400 will be described with reference to the measurement system 101 of FIG. 1 and a first configuration 200A of the measurement system 101 shown in FIG. 2A. A controller 130 is operable to facilitate the operations of the method 400.

At operation 401, a fixed beam angle $\vartheta_0$ and an initial orientation angle $\phi_{initial}$ of a plurality of optical device structures 109 are determined. The fixed beam angle $\vartheta_0$ is the initial angle of light beams to be projected to a substrate 103. The initial orientation angle $\phi_{initial}$ is the desired orientation angle of each of the plurality of optical device structures 109. In one embodiment, which can be combined with other embodiments described herein, the fixed beam angle $\vartheta_0$ and the initial orientation angle $\phi_{initial}$ are determined by a predetermined specification of the optical device structures 109 for each of the gratings 107 of the optical devices 105 on the substrate 103 prior to fabricating the optical devices 105. In another embodiment, which can be combined with other embodiments described herein, the fixed beam angle $\vartheta_0$ and the initial orientation angle $\phi_{initial}$ are determined by estimation.

At operation 402, the stage 102 is rotated about the z-axis to positon the initial orientation angle $\phi_{initial}$ of the optical device structures 109, of the first zone 115, perpendicular with light beams to be projected to the first zone 115 of the substrate 103. The first zone 115 corresponds to the first region of the optical device structures 109 to be measured. At operation 403, the light beams from an optical arm 104 having a wavelength ($\lambda_{laser}$) are projected to the substrate 103 at the fixed beam angle $\vartheta_0$.

At operation 404, a reflected beam angle $\vartheta_{reflected}$ of first order mode beams (R_$1^{st}$) reflected by the optical device structures 109 is determined. In one embodiment, which can be combined with other embodiments described herein, the method 400 utilizes the configuration 200A of the optical arm 104 of the measurement system 101. A first image of a second light path 222A is detected by a first detector 208. A second image of a second light path 222B is detected by a second detector 218. The second image is rotated by a first dove prism 214 such that the second image is rotated 180° from the first image.

In another embodiment, which can be combined with other embodiments described herein, the method 400 utilizes the configuration 200B of the optical arm 104 of the measurement system 101. A first image of a second light path 222A is detected by a first detector 208. A plurality of second images of a second light path 222B, . . . 222n is detected by a plurality of second detectors 218. Each second image of the plurality of second images is rotated 360°/n from the first image, where n is the number of images detected by the second detector 218.

In another embodiment, which can be combined with other embodiments described herein, the method 400 utilizes the configuration 200C of the optical arm 104 of the measurement system 101. A first image of a second light path 222A is detected by a first detector 208. The first image is rotated by a second dove prism 224. A plurality of second images of a second light path 222B, . . . 222n are detected by a plurality of second detectors 218. Each second image of the plurality of second images is rotated 360°/n from the first image, where n is the number of images detected by the second detector 218.

In another embodiment, which can be combined with other embodiments described herein, the method 400 utilizes the configuration 200D of the optical arm 104 of the measurement system 101. A first dove prism 214 includes a dove prism actuator 226 that rotates the first dove prism 214. Multiple images, such as a first image and a plurality of second images are detected by a first detector 208. Each second image of the plurality of second images is rotated 360°/n from the first image, where n is the number of images detected by the first detector 208.

In another embodiment, which can be combined with other embodiments described herein, the method 400 utilizes the configuration 200E of the optical arm 104 of the measurement system 101. A first image of a second light path 222A is detected by a first detector 208. A second image of a second light path 222B is detected by the second detector 218. The second image is rotated by a first dove prism 214 and reflected by a first mirror 228 and a second mirror 230 such that the second image is rotated 180° from the first image.

In another embodiment, which can be combined with other embodiments described herein, the method 400 utilizes the configuration 200F of the optical arm 104 and the detector arm 112 of the measurement system 101. The optical arm 104 can be any of the configurations 200A-200E. A first detector 208 of the detector arm 112 can detect a first image of a reflection light path 234A. A second image of a reflection light path 234B is detected by the second detector 218. The second image is rotated by a first dove prism 214 and reflected by a first mirror 228 and a second mirror 230 such that the second image is rotated 180° from the first image.

In one embodiment, which can be combined with other embodiments described herein, at least the first image and the second image are combined to generate a symmetric beam profile. In another embodiment, which can be combined with other embodiments described herein, a plurality of second images are combined with the first image to generate a symmetric beam profile. An image processing algorithm (via an image processing software) is applied to the symmetric beam profile to calculate a center of the symmetric beam profile. The image processing algorithm is at least partially executed by the controller 130.

Utilizing the measurement system 101 described herein allows for the combination of multiple images to determine the center of the symmetric beam profile. When non-opaque substrates 103 are utilized, interference due to multi-surface reflection may occur, which will alter the intensity profile projected to the detector. The measurement system 101 allows for the projection of the second images rotated at different angles to the plurality of second detectors. The rotated second images compensate for the non-symmetric interference by allowing for the center of the symmetric beam profile to be determined reliably with the additional images. By combining the second images with the first image, a center of the symmetric beam profile is obtained reliably despite the interference.

The reflected beam angle $\vartheta_{reflected}$ of the first order mode beams (R_$1^{st}$) reflected by the optical device structures 109 is calculated based one the center of the symmetric beam profile. A final orientation angle $\phi_{final}$ corresponding to the orientation angle ϕ of the optical device structures 109 is calculated based on the center of the symmetric beam profile.

In one embodiment, which can be combined with other embodiments described herein, during operations 401-404, the detector arm 112 having the first detector 208 and the second detector 218 measures a zero order mode beam (R_0), such as the reflection light path 234 (shown in FIG. 2F) reflected by the optical device structures 109 to determine an inverse reflected beam angle $\vartheta_{reflected}$. The inverse reflected beam angle $\vartheta_{reflected}$ is compared to the reflected beam angle $\vartheta_{reflected}$ to account for warpage of the substrate 103.

At operation 405, the pitch P is determined by the equation $P=\lambda_{laser}/(\sin\vartheta_0+\sin\vartheta_{reflected})$. At operation 406, the stage 102 is scanned along a scanning path 110 and operations 401-405 are repeated for subsequent zones of the one or more gratings 107 of the one or more optical devices 105.

In summation, devices and methods of measuring a pitch P of optical device structures and an orientation angle ϕ of the optical device structures are provided herein. The devices and method provide for a more accurate reading of the pitch P and the orientation angle ϕ by combining a first image and a second image in a measurement system. The combination of the first image and the second image increases the accuracy and repeatability of the measurements by compensating for the non-symmetric interference by allowing for the center of the symmetric beam profile to be determined reliably with the additional images. The devices and methods described herein account for the interference when measuring non-opaque substrates.

While the foregoing is directed to embodiments of the present disclosure, other and further embodiments of the disclosure may be devised without departing from the basic scope thereof, and the scope thereof is determined by the claims that follow.

What is claimed is:

1. A system, comprising:
   a stage having a substrate support surface, the stage coupled to a stage actuator configured to move the stage in a scanning path and rotate the stage about an axis; and
   an optical arm coupled to an arm actuator configured to scan the optical arm and rotate the optical arm about the axis, the optical arm having:
      a light source, the light source emitting a light path operable to be projected to a substrate disposed on the substrate support surface;
      a first beam splitter and a second beam splitter positioned in the light path;
      a first dove prism;
      a first lens and a second lens, wherein the first beam splitter is configured to direct the light path through the first lens and the second beam splitter is configured to direct the light path through the first dove prism and the second lens;
      a first detector operable to detect the light path from the first lens; and
      a second detector operable to detect the light path from the second lens; and
   a controller configured to be in communication with the first detector and the second detector such that in operation when the controller is in communication with the first detector and the second detector the controller combines a first image detected by the first detector and a second image detected by the second detector to form a symmetric beam profile.

2. The system of claim 1, further comprising:
   additional second beam splitters, the additional second beam splitters directing the light path through additional first dove prisms and additional second lenses; and
   additional second detectors, each second detector operable to detect the light path projected from each of the additional second lenses, the additional second detectors each configured to detect a second image projected from each of the additional second lenses.

3. The system of claim 2, further comprising a second dove prism, the second dove prism positioned in the light path between the first lens and the first detector.

4. The system of claim 3, wherein the second dove prism is configured to rotate a first image projected to the first detector, wherein the first image is rotated to an angle different than each of the second images.

5. The system of claim 1, wherein the first detector is configured to detect a first image projected from the first lens.

6. The system of claim 5, wherein the second detector is configured to detect a second image projected from the second lens.

7. The system of claim 6, wherein the first dove prism is configured to rotate the second image projected to the second detector, wherein the second image is rotated to an angle different than the first image.

8. The system of claim 7, wherein the second image is rotated 180° from the first image.

9. The system of claim 1, further comprising a detector arm coupled to a detector arm actuator configured to scan the detector arm and rotate the detector arm about the axis, the detector arm having:
   a third beam splitter and a fourth beam splitter positioned in the light path, the third beam splitter directing the light path through a third lens, the fourth beam splitter directing the light path through a second dove prism and a fourth lens;
   a third detector operable to detect the light path from the third lens; and
   a fourth detector operable to detect the light path from the fourth lens.

10. The system of claim 1, wherein the first detector and the second detector is one of a lateral sensor, a quadrant censor, or an image sensor array.

11. A system, comprising:
   a stage having a substrate support surface, the stage coupled to a stage actuator configured to move the stage in a scanning path and rotate the stage about an axis; and
   an optical arm coupled to an arm actuator configured to scan the optical arm and rotate the optical arm about the axis, the optical arm having:
      a light source, the light source emitting a light path operable to be projected to a substrate disposed on the substrate support surface;
      a first beam splitter and a second beam splitter positioned in the light path;
      a first dove prism;
      a first lens and a second lens, wherein the first beam splitter is configured to direct the light path through the first lens and the second beam splitter is configured to direct the light path through the first dove prism and the second lens;
      a first detector operable to detect the light path from the first lens, the first detector is configured to detect a first image projected from the first lens; and
      a second detector operable to detect the light path from the second lens, the second detector is configured to detect a second image projected from the second lens; and a controller configured to be in communication with the first detector and the second detector such that in operation when the controller is in communication with the first detector and the second detector the controller combines a first image detected by the first detector and a second image detected by the second detector to form a symmetric beam profile, wherein the controller is configured to execute an image processing software to determine a center of the symmetric beam profile.

12. A system, comprising:
a stage having a substrate support surface, the stage coupled to a stage actuator configured to move the stage in a scanning path and rotate the stage about an axis;
an optical arm coupled to an arm actuator configured to scan the optical arm and rotate the optical arm about the axis, the optical arm having:
   a light source, the light source emitting a light path operable to be projected to a substrate disposed on the substrate support surface;
   a dove prism positioned in the light path between the light source and the substrate support surface, the dove prism configured to rotate to project a first image and a second image onto a first detector;
   a first beam splitter positioned in the light path;
   a first lens, wherein the first beam splitter is configured to direct the light path through the first lens; and
   the first detector operable to detect the light path projected from the first lens; and
a controller configured to be in communication with the optical arm having the dove prism and the first detector such that in operation the controller is configured to combine the first image and the second image to form a symmetric beam profile.

13. The system of claim 12, wherein the dove prism is coupled to an actuator, the actuator configured to rotate the dove prism.

14. The system of claim 13, wherein the first detector is configured to detect a first image and a plurality of second images projected from the first lens.

15. The system of claim 14, wherein the dove prism is configured to rotate such that the plurality of second images projected to the first detector are each rotated to an angle different than the first image.

16. The system of claim 12, wherein the first detector is one of a lateral sensor, a quadrant censor, or an image sensor array.

17. A method, comprising:
determining a fixed beam angle $\vartheta_0$ of a light source and an initial orientation angle $\phi_{initial}$ of a first zone of optical device structures of a substrate;
rotating the substrate to position the initial orientation angle $\phi_{initial}$ perpendicular to a light path to be projected to the first zone of the substrate at the fixed beam angle $\vartheta_0$;
projecting the light path having a wavelength ($\lambda_{laser}$) to the first zone of the substrate at the fixed beam angle $\vartheta_0$, the light path diffracting from the optical device structures to a beam splitter, the beam splitter directing a first portion of the light path to a first detector and a second portion of the light path to a second detector;
detecting a first image from the first portion of the light path with the first detector; and
detecting a second image from the second portion of the light path with the second detector, wherein the second image is rotated to an angle different than the first image, wherein a symmetric beam profile is obtained by combining the first image and the second image.

18. A method, comprising:
determining a fixed beam angle $\vartheta_0$ of a light source and an initial orientation angle $\phi_{initial}$ of a first zone of optical device structures of a substrate;
rotating the substrate to position the initial orientation angle $\phi_{initial}$ perpendicular to a light path to be projected to the first zone of the substrate at the fixed beam angle $\vartheta_0$;
projecting the light path having a wavelength ($\lambda_{laser}$) to the first zone of the substrate at the fixed beam angle $\vartheta_0$, the light path diffracting from the optical device structures to a beam splitter, the beam splitter directing a first portion of the light path to a first detector and a second portion of the light path to a second detector;
detecting a first image from the first portion of the light path with the first detector;
detecting a second image from the second portion of the light path with the second detector, wherein the second image is rotated to an angle different than the first image; and
measuring a reflected beam angle $\vartheta_{reflected}$ of the light path reflected by the substrate, the reflected beam angle $\vartheta_{reflected}$ derived from a center of a symmetric beam profile, the symmetric beam profile obtained by combining a first image and a second image of the light path reflected by the substrate, and wherein the second image rotated at a rotation angle different than the first image.

19. The method of claim 18, further comprising determining a pitch P of the optical device structures by a pitch equation $P=\lambda_{laser}(\sin \vartheta_0 + \sin \vartheta_{reflected})$.

20. The method of claim 19, further comprising detecting additional second images projected to the second detector.

* * * * *